(12) United States Patent
Koch et al.

(10) Patent No.: US 9,806,322 B2
(45) Date of Patent: Oct. 31, 2017

(54) BATTERY CELL CONNECTOR

(75) Inventors: Ingo Koch, Hameln (DE); Peter Streuer, Hannover (DE); Andreas Dudenbostel, Neustadt (DE); Anja Schwarze, Hemmingen (DE); Dirk Stellfeldt, Uetze (DE); Peter Schellenberg, Wunstorf (DE)

(73) Assignee: Johnson Controls Autobatterie GmbH & Co. KGAA (DE)

( * ) Notice: Subject to any disclaimer, the term of this patent is extended or adjusted under 35 U.S.C. 154(b) by 0 days.

(21) Appl. No.: 13/257,528

(22) PCT Filed: Mar. 24, 2010

(86) PCT No.: PCT/EP2010/001848
§ 371 (c)(1),
(2), (4) Date: Dec. 6, 2011

(87) PCT Pub. No.: WO2010/108667
PCT Pub. Date: Sep. 30, 2010

(65) Prior Publication Data
US 2012/0263992 A1  Oct. 18, 2012

(30) Foreign Application Priority Data
Mar. 24, 2009 (DE) .......... 10 2009 014 116

(51) Int. Cl.
*H01M 2/26* (2006.01)
*H01M 2/28* (2006.01)
*H01M 2/20* (2006.01)

(52) U.S. Cl.
CPC .......... *H01M 2/266* (2013.01); *H01M 2/206* (2013.01); *H01M 2/26* (2013.01); *H01M 2/28* (2013.01)

(58) Field of Classification Search
CPC .......... H01M 2/26; H01M 2/28; H01M 2/206; H01M 2/266
(Continued)

(56) References Cited

U.S. PATENT DOCUMENTS 4,420,673 A  12/1983  Eberle
4,724,190 A *  2/1988  Siga et al. .......... 429/158
(Continued)

FOREIGN PATENT DOCUMENTS

DE  102006053172  *  3/2008  .......... H01M 2/20
DE  10-2007-011390  *  9/2008  .......... H01M 2/20
(Continued)

OTHER PUBLICATIONS

JP-57111950—Jul. 1982 Translation.*
International Search Report for PCT/EP10/001848 dated Jun. 10, 2010.

*Primary Examiner* — Milton I Cano
*Assistant Examiner* — Michael Dignan
(74) *Attorney, Agent, or Firm* — Boardman & Clark LLP

(57) ABSTRACT

The invention relates to a battery cell connector with a first and a second substantially flat limb (1, 2), wherein the first limb (1) has a connecting side (3) for connection to a plurality of electrodes of a battery, the second limb (2) is arranged at an angle with respect to the first limb (1) and extends from that side (4) of the first limb which is opposite the connection side (3), wherein a shoulder (5) is provided which extends from the first to the second limb. Against this background, the invention specifies a battery cell connector with a high current-carrying capacity which is improved in comparison with the known battery cell connectors. For this purpose, the invention provides that the profile of the height (h) of the shoulder (5) from the first limb (1) towards the (Continued)

second limb is nonlinear and is convex with respect to the first and the second limb (1, 2).

11 Claims, 2 Drawing Sheets

(58) Field of Classification Search
USPC .................................. 429/121–164; 29/623.1
See application file for complete search history.

(56) References Cited

U.S. PATENT DOCUMENTS

| | | | |
|---|---|---|---|
| 5,424,148 A * | 6/1995 | Mrotek et al. ................ | 429/158 |
| 2010/0003593 A1* | 1/2010 | Oldenburg et al. ........... | 429/161 |
| 2010/0183921 A1* | 7/2010 | Streuer ................... | H01M 2/28 |
| | | | 429/211 |
| 2010/0190045 A1* | 7/2010 | Streuer et al. ................ | 429/122 |

FOREIGN PATENT DOCUMENTS

| | | |
|---|---|---|
| DE | 10 2007 022246 A1 | 11/2008 |
| JP | 57 111950 A | 7/1982 |
| JP | 57111950 A * | 7/1982 .............. H01M 2/28 |
| JP | 60 047370 A | 3/1985 |

* cited by examiner

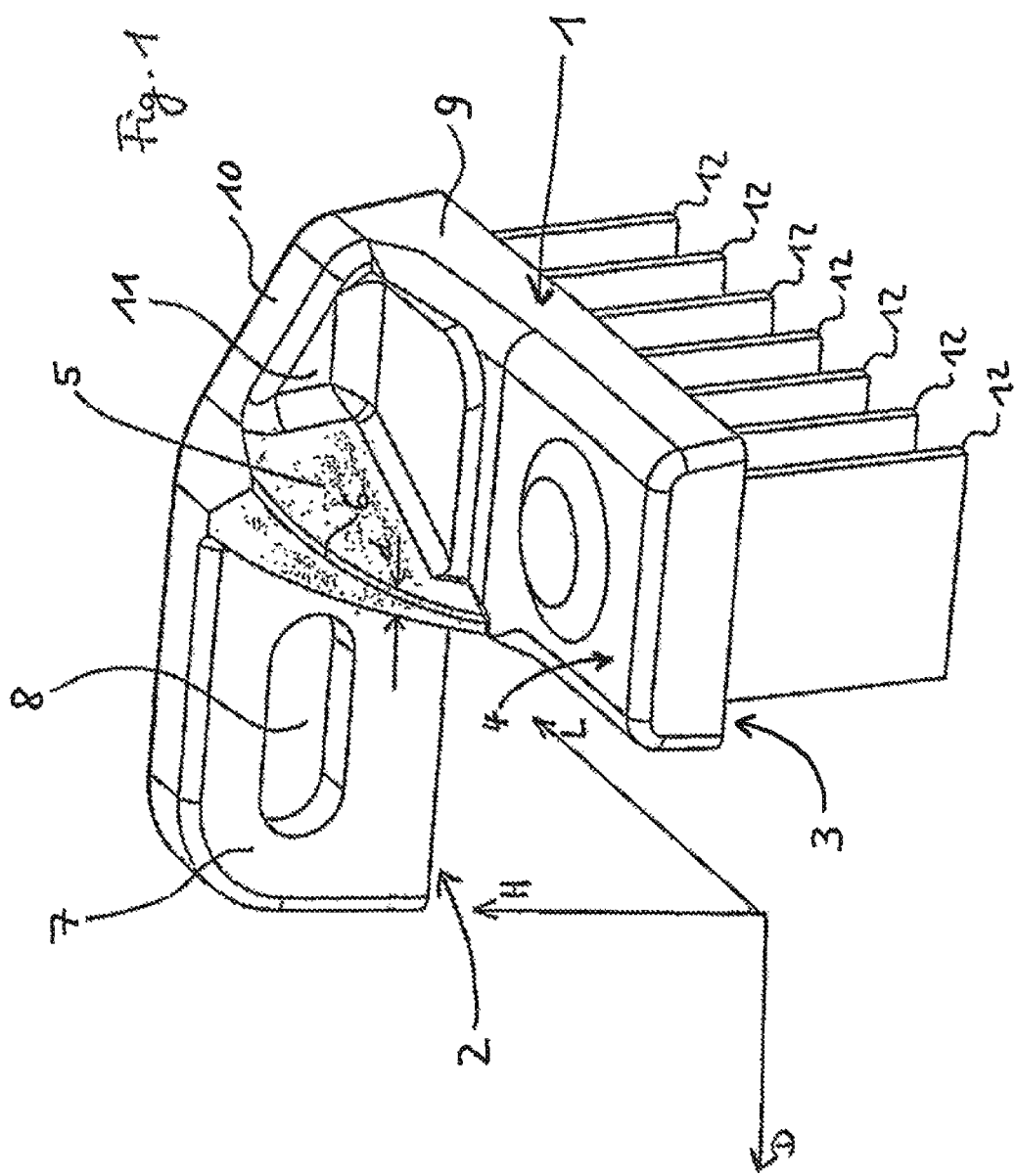

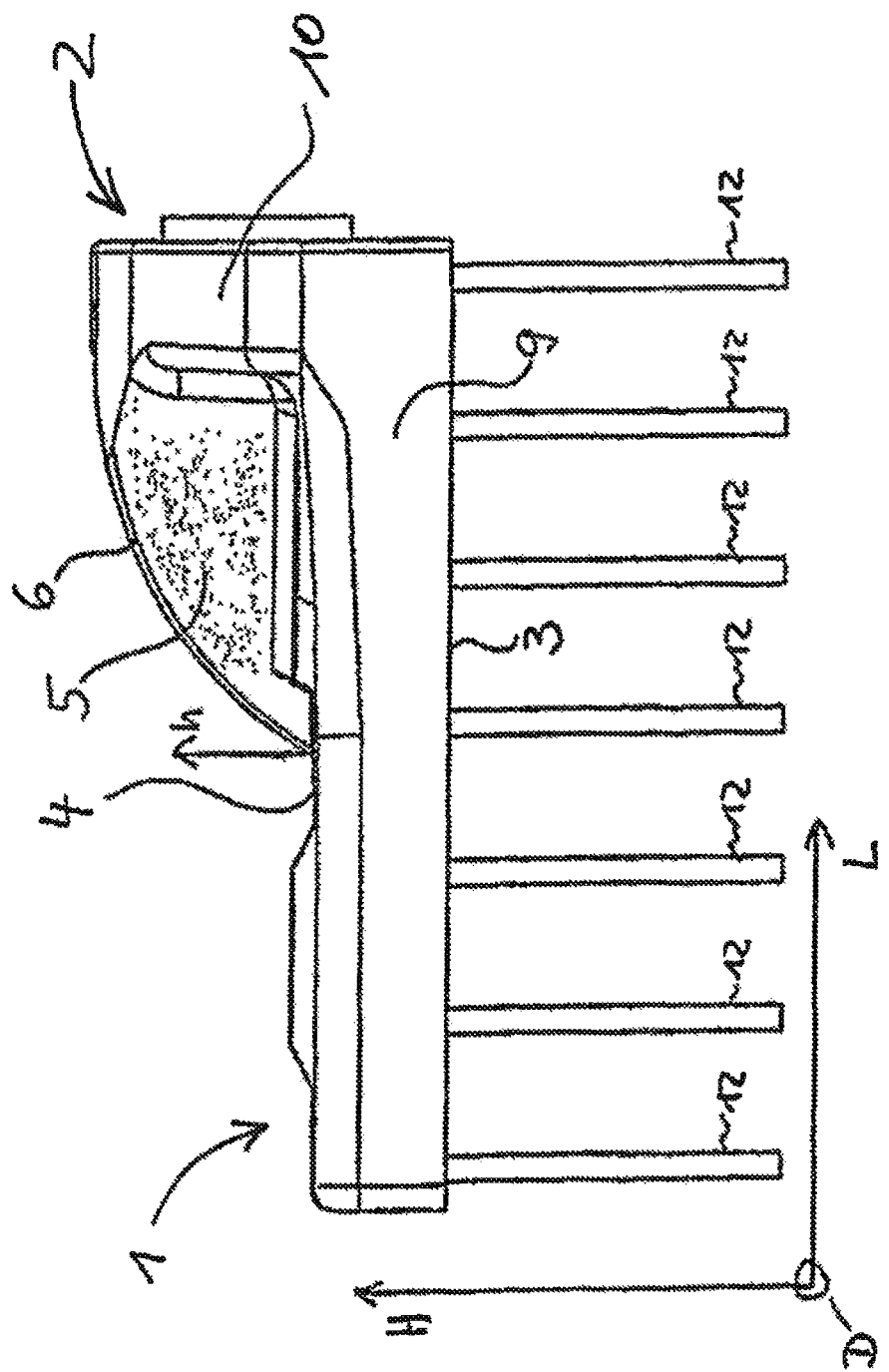

BATTERY CELL CONNECTOR

FIELD OF THE INVENTION

The invention relates to a battery cell connector. Such battery cell connectors are used, for example, in electrochemical batteries, for example starter batteries for automobiles, for internal connection between the electrode stacks of the cells of the battery.

BACKGROUND

Battery cell connectors of the generic type are known, for example, from DE 10 2007 022 246 A1 or U.S. Pat. No. 5,424,148.

SUMMARY OF THE DESCRIPTION

The invention is based on the object of specifying a battery cell connector with an improved capability to withstand high current compared to the known battery cell connectors.

This object is achieved by the invention disclosed herein. Advantageous developments of the invention are also specified herein.

The term capability to withstand high current means a property of the battery cell connector to be able to continuously transmit the highest possible current or to be able to transmit the highest possible current for the longest possible time without damage.

The battery cell connector according to the invention has the advantage that a significantly improved capability to withstand a high current is achieved by the introduction of a shoulder which is arranged and shaped in a specific way and which extends between the two limbs of the battery cell connector. The shoulder is understood in this context to be a wall-like connecting element which will be described in more detail below on the basis of the exemplary embodiments. The shoulder which is configured according to the invention with a nonlinear convex height profile can, as has been noted, on the one hand promote the flow of current through the battery cell connector, and this already counteracts heating of the battery cell connector due to high currents. In addition, the shaping of the shoulder according to the invention brings about an improved temperature distribution when the battery cell connector heats up due to the current, such that the temperature distribution becomes more uniform and at the same time an improved conduction away of heat is made possible. As has been noted, the advantages explained above assist one another in a synergetic fashion so that a considerable improvement in the capability of the battery cell connector to withstand a high current can be achieved by a measure, such as the inventive shaping of the shoulder, which is relatively easy to implement in terms of production technology.

According to one advantageous development of the invention, the thickness of the shoulder increases, with respect to the same height line, from the first limb toward the second limb. According to a further development, the increase in the thickness takes place in a linear or progressive manner. These measures can additionally improve the capability of the battery cell connector according to the invention to withstand a high current. It has in fact been found that an accumulation of material in the region of the junction between the first limb and the second limb of the battery cell connector provides particular improvements in terms of the capability to withstand a high current. An accumulation of material means that the specified improvements are promoted by virtue of the fact that as much material as possible is provided in the shoulder in the vicinity of the junction between the first and the second limbs.

It is also advantageous to make the profile of the height of the shoulder toward the second limb degressive. In the vicinity of the second limb, the upper side of the shoulder advantageously extends virtually in parallel with that side of the first limb which is turned away from the connection side of the battery cell connector. In addition, a height contour of the shoulder which is leveled in such a way optimizes the current flow through the battery cell connector and therefore also improves the capability to withstand a high current. It is advantageous to embody the shoulder in such a way that the increase in the height of the shoulder does not take place linearly but rather with an initially relatively steep rise and a profile of the height which is then virtually horizontal toward the second limb.

According to one advantageous development of the invention, the shoulder forms, considered from the side which is opposite the connection side, an at least approximate right angle with respect to the second limb.

The invention will be explained below in more detail on the basis of an exemplary embodiment and using drawings, in which:

FIG. 1 shows a battery cell connector according to the invention in a perspective illustration, and FIG. 2 shows the battery cell connector according to FIG. 1 in a side view.

In the figures, identical reference symbols are used for elements which correspond to one another.

Battery cell connectors are used in the battery to connect electrodes with the same polarity (in some cases also referred to as pole plates in the references) to one another and to produce a connection to a battery cell connector of an adjacent battery cell.

The battery cell connector which is illustrated in the figures serves to connect the electrodes of a lead accumulator to a battery cell connector of an adjacent battery cell of the lead accumulator. In this context, a multiplicity of electrodes are connected to the battery cell connector via connecting lugs. When such lead accumulators are fabricated, the electrodes are usually connected to the battery cell connectors in a lug casting method. These connected electrodes are subsequently installed in the lead accumulator. The battery cell connector connects the electrodes of a plate assembly, i.e. either of the positive or the negative plates, electrically and mechanically to one another. The battery cell connector which is illustrated in the figures can be used, for example, in what are referred to as AGM batteries. This involves the battery cell connector being advantageously embodied as what is referred to as a side connector which has a relatively small overall height. As a result, the battery cell connector is relatively low in the battery, which improves the utilization of the available battery cell height for the electrodes.

After installation in the battery, the battery cell connector according to the invention is mainly not immersed in the battery acid. There is therefore essentially no direct cooling by the fluid, with the result that the battery cell connector can heat up to a great extent relatively quickly when it is loaded with high currents, for example currents above 500 amperes. In this context the battery cell connector may be damaged, for example due to melting of individual regions. Melting occurs in the known battery cell connectors in particular at a welding point between the first and second limbs of the battery cell connector. Since cooling at the points which are subject to the greatest temperature loading occurs essentially through conduction of heat into the electrodes and to a small extent through convection in such an arrangement of battery cell connectors, the relatively small thermal capacity can result relatively quickly in a high degree of heating of the battery cell connector.

In order to illustrate better the various orientations of the components of the battery cell connector explained below, FIGS. 1 and 2 illustrate a coordinate system with the axes L, H and D. The axis L extends in the longitudinal direction of the first limb 1 of the battery cell connector. The axis H extends in the vertical direction, and the axis H extends in the lateral direction, i.e. in the dimension of the width of the first limb 1.

The first limb 1 has a connection side 3 which is provided for connection to a plurality of electrodes of the battery. The electrodes are illustrated only as details in the form of connecting lugs 12 in FIG. 1. A side 4 of the first limb is located opposite the connection side 3. The second limb 2 is arranged essentially perpendicularly with respect to the first limb and extends away from the side 4.

The second limb 2 also has an extent beyond the first limb 1 in the direction of the axis D, i.e. in the lateral direction of the first limb 1. In this region, the second limb 2 has a contact clip 7 which serves to make electrical contact between the electrodes and a contact clip of a battery cell connector of an adjacent battery cell. The contact clip 7 has an elongate-hole-like opening 8. When the battery is mounted, the contact clips of battery cell connectors of adjacent battery cells are then welded to one another in the region of the elongate-hole-like openings.

Furthermore, a shoulder 5 is provided which extends from the first limb 1 to the second limb 2 and forms a wall-like connection between these limbs 1, 2. The shoulder 5 has a profile of the height h which can be seen in particular in FIG. 2, measured in the direction of the axis H, which is nonlinear and is convex with respect to the first and second limbs 1, 2. As a result, starting from the side 4 of the first limb 1, there is an initially relatively steep rise in the height h and a flattening of the profile of the height h toward the second limb 2 such that the profile extends in a virtually horizontal or parallel fashion with respect to the side 4. Overall, this results in a degressive height profile. Along the height profile, the shoulder 5 has a chamfer 6.

The shoulder 5 also has a thickness d which changes in the direction of the axis L, with the thickness d being measured in the direction of the axis D with a constant height value (in the direction h). The thickness d increases from the first limb 1 toward the second limb 2 in such a way that a linear or progressive profile occurs. As a result, a relatively large material accumulation occurs in the vicinity of the second limb 2.

As a result of the various measures for accumulating material in this region which is subject to particularly strong thermal loading, a greater heat storage capacity is additionally provided, which has the advantage that heating occurs more slowly than in known battery cell connectors. The battery cell connector according to the invention can therefore withstand a high current loading for longer.

The first limb 1 also has an increase in its thickness, measured in the direction of the axis H. As can be seen in particular in FIG. 2, the material thickness of the first limb 1 increases toward the second limb 2 in a region 9.

The second limb 2 has, in the region in which it is connected to the first limb 1, a beveled region 10 such that the height of the second limb 2 decreases essentially linearly, measured in the direction of the axis H, toward the end of the second limb 2, facing the first limb 1.

A wall 11 is provided in the second limb 2 underneath the beveled region 10. The section 10, in conjunction with the wall 11, advantageously causes the battery cell connector to be mechanically stabilized and also causes current to be conducted. In particular, by virtue of a section 10 which is configured more steeply compared to known battery cell connectors, the capability of the battery cell connector to withstand a high current can be further improved.

The described battery cell connector has already been examined under extreme conditions. It has become apparent that when the battery cell connector is overloaded with a current of 800 amperes, the operating time up to melting could be improved from the previously approximately 44 seconds to 60 seconds. The battery cell connector according to the invention therefore contributes considerably to improving the functioning and operational reliability of starter batteries in vehicles.

The invention claimed is:

1. A battery cell connector comprising:
    a first limb having a length extending in a first direction, a width extending in a second direction, and a height extending in a third direction, the first limb having a top and a bottom, each defined by the length and width and a first side and a second side, each defined by the length and height;
    a second limb having a second limb width extending in the first direction, a second limb length extending in the second direction and a second limb height extending in the third direction, the second limb length extending in the second direction away from the first side of the first limb;
    a first shoulder connecting the first limb and the second limb, the first shoulder extending along the length of the first side of the first limb in the first direction, the shoulder having a height extending in the third direction;
    a second shoulder comprising a beveled region and a wall, the beveled region extending from the first shoulder to the second side of the first limb in the second direction, the beveled region coupled to the first shoulder and the first limb, the wall connecting the beveled region to the first limb;
    wherein the first direction, second direction, and third direction differ from each other; and
    wherein the first shoulder increases in thickness as measured in the second direction from a first end of the first shoulder to a second end of the first shoulder, the first end comprising an intersection of the first limb, second limb, first shoulder, and second shoulder, and the second end comprising an intersection of the first shoulder with the first limb the second end being spaced apart from the first end as measured in the first direction; and
    wherein the first shoulder decreases in height as measured in the third direction in a convex and nonlinear manner from the first end to the second end.

2. The battery cell connector of claim 1, wherein the first limb has an increase in its thickness, measured in the vertical direction of the first limb.

3. The battery cell connector of claim 1, wherein the thickness of the shoulder decreases linearly or progressively from the first end to the second end.

4. The battery cell connector of claim 1, wherein the second limb has a contact clip for making electrical contact between electrodes connected to the connection side and external elements.

5. The battery cell connector of claim 1, wherein viewed from the top of the first limb, the second shoulder forms an at least approximate right angle with respect to the second limb.

6. The battery cell connector of claim 1, wherein the second limb is arranged substantially perpendicularly with respect to the first limb.

7. The battery of claim 1, wherein the first shoulder comprises a chamfer along the profile of the height of the first shoulder.

8. The battery cell connector of claim 1, wherein the first limb has an increase in its thickness, measured in the third direction of the first limb.

9. The battery cell connector of claim 1, wherein the thickness of the first shoulder increases linearly or progressively toward the second limb.

10. The battery cell connector of claim 1, wherein the second limb has a contact clip for making electrical contact between electrodes connected to the connection side and external elements.

11. A battery having the battery cell connector of claim 1.

* * * * *